United States Patent Office 3,810,904
Patented May 14, 1974

---

3,810,904
HYDRAZIDES OF PYRAZOLOPYRIDINE CARBOXYLIC ACIDS AND ESTERS
Hans Hoehn, Tegernheim, Germany, and Mark Chasin, Englishtown, N.J., assignors to E. R. Squibb & Sons, Inc., Princeton, N.J.
No Drawing. Continuation-in-part of application Ser. No. 42,415, June 1, 1970, which is a continuation-in-part of application Ser. No. 833,672, June 16, 1969, both now abandoned. This application Sept. 22, 1972, Ser. No. 291,445
Int. Cl. C07d 31/36
U.S. Cl. 260—295.5 B
6 Claims

ABSTRACT OF THE DISCLOSURE

New hydrazides of pyrazolopyridine carboxylic acids and esters having the general formula

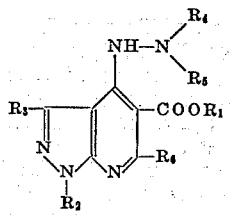

wherein $R_1$ is hydrogen, lower alkyl or phenyl-lower alkyl, $R_2$ is hydrogen, lower alkyl, phenyl, phenyl-lower alkyl, $R_7$, $R_8$-phenyl-lower alkyl or cycloalkyl-lower alkyl, $R_3$ is hydrogen lower alkyl, phenyl or $R_7$, $R_8$-phenyl, $R_4$ is hydrogen or lower alkanoyl, $R_5$ is lower alkanoyl, $R_6$ is hydrogen or lower alkyl and $R_7$ and $R_8$ each is halogen, lower alkyl or lower alkoxy, and acid addition salts thereof, which are antimicrobial agents and central depressants are the subject of this invention.

---

This invention is a continuation-in-part of application Ser. No. 42,415, filed June 1, 1970, which in turn is a continuation-in-part of application Ser. No. 833,672, filed June 16, 1969, both abandoned.

BRIEF SUMMARY OF THE INVENTION

The invention relates to new hydrazines, hydrazides and hydrazones of pyrazolopyridine carboxylic acids and esters, and salts thereof. The new hydrazines, hydrazides and hydrazones have the structural formulas

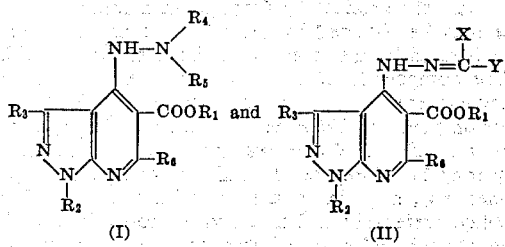

In Formulas I and II, $R_1$ represents hydrogen, straight or branched alkyl up to 12 carbons preferably lower alkyl, or phenyl-lower alkyl, $R_2$ represents hydrogen, lower alkyl, phenyl, phenyl-lower alkyl, substituted phenyl-lower alkyl or cycloalkyl-lower alkyl, $R_3$ represents hydrogen, lower alkyl, phenyl or substituted phenyl, $R_4$ represents hydrogen, lower alkyl, lower alkanoyl or phenyl, $R_5$ represents hydrogen, lower alkyl or lower alkanoyl, $R_6$ represents hydrogen or lower alkyl, X represents hydrogen, lower alkyl, hydroxy-lower alkyl, phenyl, substituted phenyl, phenyl-lower alkyl or substituted phenyl-lower alkyl, Y represents lower alkyl, phenyl, hydroxy-lower alkyl, substituted phenyl, phenyl-lower alkyl or substituted phenyl-lower alkyl and together X and Y are cycloalkyl or 5-nitro-2-furyl.

This application relates particularly to those members of Formula I which have the formula

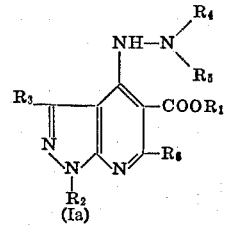

wherein $R_1$ is hydrogen, lower alkyl or phenyl-lower alkyl, $R_2$ is hydrogen, lower alkyl, phenyl, phenyl-lower alkyl, $R_7$, $R_8$-phenyl-lower alkyl or cycloalkyl-lower alkyl, $R_3$ is hydrogen, lower alkyl, phenyl or $R_7$,$R_8$-phenyl, $R_4$ is hydrogen or lower alkanoyl, $R_5$ is alkanoyl, $R_6$ is hydrogen or lower alkyl, and $R_7$ and $R_8$ each is halogen, lower alkyl or lower alkoxy and physiologically acceptable acid addition salts thereof.

The lower alkyl groups represented by the symbols are straight or branched chain hydrocarbon groups of up to seven carbon atoms such as methyl, ethyl, propyl, isopropyl, butyl, isobutyl, t-butyl, amyl and the like.

Similar lower alkyl groups are part of the phenyl-lower alkyl and cycloalkyl-lower alkyl substituents. The substituted phenyl and phenyl-lower alkyl groups include phenyl rings bearing one or two substituents, e.g., $R_7$, $R_8$-phenyl wherein $R_7$ and $R_8$ each is halogen, especially chlorine or bromine, lower alkyl or lower alkoxy. Thus there are included phenyl, chlorophenyl, e.g., o-, m- or p-chlorophenyl, bromophenyl, o-, m- or p-tolyl, 2,5-dichlorophenyl, 3,5-dimethylphenyl, 3,4-dimethoxyphenyl, benzyl, phenethyl, o-, m- or p-chlorobenzyl, 3,5-dichlorobenzyl, p-methoxyphenyl and the like.

The lower alkanoyl groups include the acyl radicals of the lower fatty acids of up to seven carbon atoms, e.g., acetyl, propionyl, butyryl, isobutyryl and the like.

The cycloalkyl groups are cycloaliphatics having three to seven carbons, e.g., cyclopropyl, cyclobutyl, cyclopentyl, cyclohexyl and cycloheptyl.

Preferred compounds of formula Ia are those in which $R_1$ is hydrogen or lower alkyl, especially ethyl, $R_2$ is lower alkyl, especially ethyl, or benzyl, and $R_6$ each is hydrogen, $R_4$ is hydrogen or acetyl and $R_5$ is acetyl.

DETAILED DESCRIPTION

The new compounds are formed by the following series of reactions. The symbols in the structural formulas have the same meanings previously described.

A 5-aminopyrazole of the formula (III) 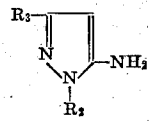

is produced as described in British Pat. 1,057,740, published Feb. 8, 1967, by ring closure of an aldehyde or ketone hydrazone of the formula (IV) 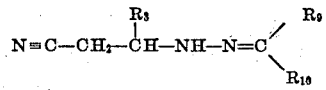

wherein $R_3$ is the same as previously defined and $R_9$ and $R_{10}$ each is hydrogen, lower alkyl, phenyl or phenyl-lower alkyl. The cyclization is effected by heating at a temperature of about 90° to 130° C. in an inert liquid solvent, e.g., an alcohol like methanol, ethanol, butanol or the like, preferably in the presence of a catalyst, e.g., alcoholates like alkali metal alcoholates particularly butylates such as sodium butylate.

This 5-aminopyrazole is reacted with an alkoxymethylene malonic acid ester of the formula (V)

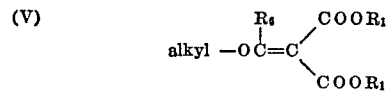

wherein $R_1$ represents lower alkyl, e.g., ethoxy methylene malonic acid diethyl ester or the like. This may be effected by heating the reactants at a temperature of the order of 120° C. for several hours, and results in a compound of the formula (VI)

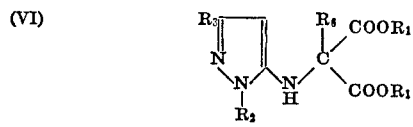

The alkoxymethylene malonic acid esters of Formula V are known compounds and are produced like ethoxymethylene malonic acid diethyl ester [Organic Synthesis 28, 60–2 (1948)].

Cyclization of a compound of Formula VI produces a product of the formula (VII)

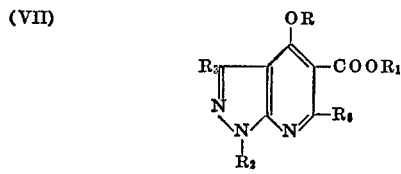

wherein R is hydrogen and $R_1$, $R_2$, $R_3$ and $R_6$ correspond respectively to $R_1$, $R_2$, $R_3$ and $R_6$ of the starting material. This reaction is carried out by heating the 5-pyrazolyl-aminomethylene malonic acid ester of Formula VI in an inert organic solvent such as diphenyl ether at a temperature of about 230 to 260° for several hours while removing, e.g., by distillation, the alcohol $R_1$—OH. The product is then separated from the solvent, e.g., by fractional distillation.

To obtain a product of Formula I wherein $R_2$ is hydrogen the foregoing procedure is modified. By this modification, a 5-aminopyrazole of Formula III wherein $R_2$ is an arylmethyl group or a heteromethyl group is used. This starting material has the formula (IIIa)

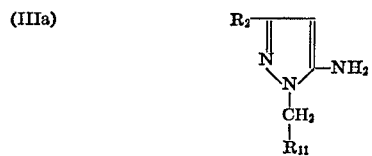

wherein $R_{11}$ is an aromatic or heterocyclic nucleus like phenyl, naphthyl, furyl, pyridyl, pyrimidyl, pyrazinyl or the like.

This material is processed as described above through the reaction with the alkoxymethylene malonic acid ester of Formula V and cyclization of the product of Formula VI thus obtained to produce a compound of Formula VII. —$CH_2$—$R_{11}$ group remains intact through these reactions.

At this point, the compound of Formula VII, having in the 1-position the —$CH_2$—$R_{11}$ substituent, is oxidized with an oxidizing agent like selenium dioxide in a high boiling solvent like diethyleneglycol dimethylether at about 160° C. This yields a compound of Formula VII wherein $R_2$ is hydrogen.

The free acid, i.e., $R_1$ is hydrogen, may be obtained from the ester obtained as described above by hydrolysis, e.g. treatment with aqueous sodium hydroxide solution.

Products of Formula VII wherein R is lower alkyl or phenyl-lower alkyl are produced from those wherein R is hydrogen by alkylation, e.g., treatment of the latter with an alkylating agent such as an alkyl halide or aralkyl halide like ethyl iodide or benzyl bromide, in an inert organic solvent such as dimethylformamide in the presence of an alkali metal carbonate such as potassium carbonate.

Reaction of any of the foregoing products of Formula VII with at least an equivalent amount of hydrazine, substituted hydrazine or a salt thereof, e.g., hydrazine hydrate, hydrazine hydrochloride, methylhydrazine, phenylhydrazine or the like yields a compound of Formula I. The material of Formula VII is dissolved in an inert, preferably dry, organic solvent, e.g., an alcohol like absolute ethanol and the hydrazine is added, preferably alone with a small amount of a metal like zinc chloride. The mixture is heated, e.g., at reflux temperature, for several hours, then the product is isolated.

Alternatively, a compound of Formula VII wherein R is hydrogen may first be converted to its chloro analog (i.e., the hydroxy group is replaced by chlorine) upon treatment with phosphorous oxychloride. The chloro compound is then treated with the hydrazine

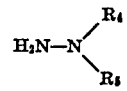

to obtain a product of Formula I.

When one or both $R_4$ and $R_5$ is a lower alkanoyl group, it is preferable to first form a product of Formula I wherein $R_4$ and $R_5$ each is hydrogen, then react this product with one or two equivalents of an acid anhydride like acetic anhydride, etc.

The hydrazide of Formula I (wherein $R_4$ and $R_5$ are both hydrogen) is converted to the hydrazone of Formula II by reaction with a carbonyl compound, e.g., an aldehyde or ketone, in an inert organic solvent such as an alcohol. Such carbonyl compounds include, for example, acetaldehyde, propionaldehyde, butyraldehyde, benzaldehyde, phenylpropionaldehyde, p-chlorobenzaldehyde, m-bromobenzaldehyde, 2,5 - dichlorobenzaldehyde, p - methoxybenzaldehyde, acetone, dihydroxyacetone, methyl ethyl ketone, methyl propyl ketone, acetophenone, phenylpropyl ketone, p-chlorophenyl ethyl ketone, cyclopropanone, cyclobutanone, cyclohexanone and the like.

A hydrazine of Formula I wherein $R_4$ is hydrogen and $R_5$ is lower alkyl or cycloalkyl may alternatively be obtained by the catalytic reduction of an appropriately substituted compound of Formula II.

The bases form salts by reaction with equivalent amounts of the common inorganic and organic acids. Such salts include the hydrohalides, e.g., hydrobromide, hydrochloride, sulfate, nitrate, phosphate, acetate, citrate, oxalate, tartrate, malate, succinate, benzoate, ascorbate, alkanesulfonate, e.g., methanesulfonate, arylsulfonate, e.g., benzenesulfonate, etc. It is frequently convenient to purify or isolate the product by forming an insoluble salt. The base may be obtained by neutralization and another salt then formed by treatment with the appropriate acid.

The compounds of this invention are useful as antimicrobial agents, e.g., in combatting infections due to organisms such as Trichomonas vaginalis, Staphylococcus aureus or Trychophyton mentagrophytes. For example, they may be administered orally to various mammalian species, e.g., mice in an amount of about 5 to 25 mg./kg./day, preferably in 2 to 4 divided doses, in any of the conventional oral dosage forms, or topically in creams in equivalent amounts. They may be used as surface disinfectants. About 0.01 to 1.0% by weight of any of these substances may be dispersed on an inert solid or in a liquid such as water and applied as a dust or spray or incorporated in a soap or other cleaning agent such as a solid or liquid detergent composition. The latter may be used, for example, in general cleaning, in cleaning dairy barns or dairy, food handling or food processing equipment.

The new compounds of this invention are central nervous system depressants and may be used as tranquilizers for the relief of anxiety and tension states, for example in mice, rats, dogs and other mammalian species, in the same manner as chlordiazepoxide. For this purpose these compounds may be incorporated in a conventional dosage form such as tablet, capsule, injectable or the like, along with the necessary carrier material, excipient, lubricant, buffer or the like, for oral or parenteral administration in single or divided doses of about 1 to 50 mg./kg./day, preferably about 2 to 15 mg./kg., two to four times daily.

The new compounds also increase the intracellular concentration of adenosine-3′,5′-cyclic monophosphate, and thus by the administration of about 1 to 100 mg./kg./day, preferably about 10 to 50 mg./kg. in single or two to four divided doses in conventional oral or parenteral dosage forms such as those described above may be used to alleviate the symptoms of asthma.

The following examples are illustrative of the invention. All temperatures are on the centigrade scale.

EXAMPLE 1

1-ethyl-4-hydrazino-1H-pyrazolo[3,4-b] pyridine-5-carboxylic acid, ethyl ester (a) {[(1-ethyl - 5 - pyrazolyl)amino]methylene}malonic acid diethyl ester: 245 g. 1-ethyl-5′-aminopyrazole (2.2 mole) and 476 g. ethoxymethylene malonic acid diethyl ester (2.2 mol.) are heated to 120° (bath temperature) for 2 hours with stirring. The ethanol formed by this reaction is removed by means of a water aspirator. Then vacuum distillation (B.P.$_{0.1}$ 154–160°) yields 520 g. (84% of theory) of a quick crystallizing oil of {[(1-ethyl-5-pyrazolyl)amino]methylene}malonic acid diethyl ester, M.P. 50–53°.

The compound is recrystallized from N-hexane, M.P. 55–57°.

The hydrochloride salt is formed by treating the above product with dilute ethanolic hydrogen chloride solution.

(b) 1-ethyl-4-hydroxy-1H-pyrazolo[3,4 - b]pyridine-5-carboxylic acid and ethyl ester: 253 g. {[(1-ethyl-5-pyrazolyl)amino]methylene}malonic acid diethyl ester (0.09 mol.) are dissolved in 770 g. of diphenyl ether. The reaction mixture is heated to 235–250° (bath temperature) and allowed to react at this temperature for 1–2 hours while the resulting ethanol is continuously distilled off. The last amount of alcohol is removed by means of a water aspirator. The diphenyl ether is separated by distillation with a fractionating column in vacuo. The 1-ethyl-4-hydroxy-1H-pyrazolo[3,4 - b]pyridine-5-carboxylic acid ethyl ester is obtained at B.P.$_{0.05}$ 115–120°, yield 195 g. =92% of theory, M.P. 85–87°. The compound is recrystallized from benzene (90 to 100°), M.P. 87–89°. Hydrolysis of this product with aqueous sodium hydroxide yields 1-ethyl-4-hydroxy-1H-pyrazolo[3,4 - b]pyridine-5-carboxylic acid, M.P. 201–202°.

(c) 4-ethoxy-1-ethyl - 1H - pyrazolo[3,4-b]pyridine-5-carboxylic acid and ethyl ester: In a solution of 259 g. (1.1 mol.) 1-ethyl-4-hydroxy-1H-pyrazolo[3,4-b]pyridine-5-carboxylic acid ethyl ester in 1700 ml. dimethylformamide, 400 g. of well pulverized potassium carbonate and 300 g. of ethyl iodide are introduced. The reaction mixture is stirred for 7 hours at 65° and filtered under suction, while hot, from excess potassium carbonate. Upon standing overnight, 165 g. of 1-ethyl-4-ethoxy-1H-pyrazolo[3,4-b]pyridine-5-carboxylic acid ethyl ester crystallize out of the solution, M.P. 112–115°. After evaporation of the mother liquor, an additional 80 g. are obtained. The total yield amounts to 85% of theory. The compound is recrystallized from benzene (90–100°), M.P. 113–115°.

By hydrolyzing this product as in part (b) 4-ethoxy-1-ethyl-1H-pyrazolo[3,4-b]pyridine-5-carboxylic acid is obtained, M.P. 198–199°.

(d) 1-ethyl-4-hydrazino - 1H - pyrazolo[3,4-b]pyridine-5-carboxylic acid ethyl ester: 316 g. of 1-ethyl-4-ethoxy-1H-pyrazolo[3,4-b]pyridine-5-carboxylic acid ethyl ester (1.2 mol.) are dissolved in 4800 ml. of absolute alcohol. Into this solution, 72 g. of hydrazine hydrate (100%) and 0.4 g. zinc chloride are added. After refluxing for 4 hours, the hot solution is filtered, evaporated to dryness in vacuo and the white crystalline residue is crystallized from a benzol-benzene mixture 1:3. There are obtained 250 g. of 1-ethyl-4-hydrazino - 1H - pyrazolo[3,4-b]pyridine-5-carboxylic acid ethyl ester, M.P. 139–140°.

The hydrochloride is formed by adding to a solution of 5 grams of the above obtained hydrazine in 100 ml. of absolute alcohol, with cooling, 5 ml. of an alcoholic solution of hydrogen chloride (6.3 N). A white crystalline precipitate forms immediately. The mixture is diluted with anhydrous ether, filtered and washed with anhydrous ether. The product is allowed to air-dry overnight.

The 1-ethyl-4-hydrazino-1H - pyrazolo[3,4-b]pyridine-5-carboxylic acid, ethyl ester hydrochloride, is recrystallized from a mixture of acetonitrile and absolute alcohol, M.P. 210–212°.

EXAMPLE 2

1-ethyl-4-isopropylidenehydrazino - 1H-pyrazolo[3,4-b] pyridine-5-carboxylic acid, ethyl ester hydrochloride A solution of 8.4 grams of 1-ethyl-4-hydrazino-1H-pyrazolo[3,4-b]pyridine-5-carboxylic acid ethyl ester in 100 ml. of acetone is refluxed for one hour. To the cooled solution of the isopropylidene hydrazine, M.P. 92–93° there is added, with cooling, 10 ml. of an alcoholic solution of hydrogen chloride (6.98 N). A white crystalline precipitate forms immediately. The mixture is diluted with 150 ml. of anhydrous ether to aid in filtering, and the solid filtered, washed with anhydrous ether, and dried at 1 mm. and 110° overnight. The product 1-ethyl-4-isopropylidenehydrazino - 1H-pyrazolo-[3,4-b]pyridine-5-carboxylic acid, ethyl ester hydrochloride, melts at 193–196°, with preliminary softening at 185°.

EXAMPLE 3

1-ethyl-4-(isopropylidenehydrazino) - 1H-pyrazolo[3,4-b] pyridine-5-carboxylic acid, hydrochloride By treating the 1-ethyl-4-hydroxy-1H-pyrazolo[3,4-b]pyridine-5-carboxylic acid ethyl ester of Example 1(b) with hydrazine and acetone as in Example 1(d) and 2, 1-ethyl-4-(isopropylidenehydrazino)-1H - pyrazolo[3,4-b]pyridine-5-carboxylic acid, hydrochloride, is obtained.

EXAMPLE 4

4-(benzylidenehydrazino) - 1 - ethyl-1H-pyrazolo[3,4-b] pyridine-5-carboxylic acid, ethyl ester hydrochloride By substituting an equivalent amount of benzaldehyde for the acetone in the procedure of Example 2, 4-(benzylidenehydrazino)-1 - ethyl-1H-pyrazolo[3,4-b]pyridine-5-carboxylic acid, ethyl ester hydrochloride is obtained.

EXAMPLE 5

4-(cyclohexylidenehydrazino - 1 - ethyl - 1H - pyrazolo-[3,4-b]pyridine-5-carboxylic acid, ethyl ester, hydrochloride By substituting cyclohexane for acetone in the procedure of Example 2, 4-(cyclohexylidene hydrazino)-1-ethyl-1H-pyrazolo[3,4-b]pyridine-5-carboxylic acid, ethyl ester, M.P. 127°, and hydrochloride, M.P. 198–199° are obtained.

EXAMPLE 6

1-benzyl - 4 - (isopropylidenehydrazino) - 1H - pyrazolo-[3,4-b]pyridine-5-carboxylic acid, hydrochloride and 1-benzyl-4-benzylidenehydrazino - 1H-pyrazolo[3,4-b] pyridine-5-carboxylic acid hydrochloride By substituting an equivalent amount of 1-benzyl-5-aminopyrazole for the 1-ethyl-5-aminopyrazole in the procedure of Example 1, 1-benzyl - 4 - hydroxy-1H-pyrazolo[3,4-b]pyridine-5-carboxylic acid ethyl ester, M.P.

117–119°, and 1-benzyl-4-hydroxy-1H-pyrazolo[3,4-b]pyridine-5-carboxylic acid, M.P. 197–198°, are obtained.

By treating either of the foregoing compounds with hydrazine hydrate according to the procedure of Example 1(d), 1-benzyl-4-hydrazino-1H-pyrazolo[3,4-b]pyridine-5-carboxylic acid or the ethyl ester is obtained. Then by treating the hydrazine thus obtained with acetone and benzaldehyde, respectively, according to the procedure of Example 2, the isopropylidene hydrazine hydrochloride and benzylidene hydrazine hydrochloride, respectively, are obtained, as the free carboxylic acid or ethyl ester, respectively.

EXAMPLE 9

1-ethyl-4-[(5-nitrofurfurylidene)hydrazino]-1H-pyrazolo[3,4-b]pyridine-5-carboxylic acid, ethyl ester By treating the product of Example 1(d) with 5-nitrofurfuraldehyde according to the procedure of Example 2, the above named product, M.P. 228–229°, is obtained.

By using the 5-aminopyrazole with the substituents indicated in the first column below in place of 1-ethyl-5-aminopyrazole and following the procedure of Example 1, alkylating with ethyl iodide or benzyl bromide as in part (c), there are obtained the 1H-pyrazolo[3,4-b]pyridine-5-carboxylic acids and esters of Formula VII with the substituents indicated in the second column:

| | 5-aminopyrazole | | Pyrazolopyridine | | | |
|---|---|---|---|---|---|---|
| Ex. | $R_3$ | $R_2$ | R | $R_1$ | $R_3$ | $R_2$ |
| 10 | o-ClC$_6$H$_4$CH$_2$ | CH$_3$ | H | C$_2$H$_5$ | o-ClC$_6$H$_4$CH$_2$ | CH$_3$ |
| 11 | H⟩—CH$_3$ | CH$_3$ | H | C$_2$H$_5$ | H⟩—CH$_3$ | CH$_3$ |
| 12 | Same as above | H | C$_2$H$_5$ | C$_2$H$_5$ | Same as above | H |
| 13 | C$_3$H$_7$ | H | H | H | C$_3$H$_7$ | H |
| 14 | p-ClC$_6$H$_4$CH$_2$ | H | H | C$_2$H$_5$ | p-ClC$_6$H$_4$CH$_2$ | H |
| 15 | p-ClC$_6$H$_4$CH$_2$ | H | H | H | p-ClC$_6$H$_4$CH$_2$ | H |
| 16 | CH$_3$ / C$_6$H$_5$CH | CH$_3$ | H | C$_2$H$_5$ | CH$_3$ / C$_6$H$_5$CH | CH$_3$ |
| 17 | CH$_3$ | (CH$_3$)$_2$CH | H | C$_2$H$_5$ | CH$_3$ | (CH$_3$)$_2$ |
| 18 | C$_2$H$_5$ | H | (CH$_3$)$_2$CH$_2$ | C$_2$H$_5$ | C$_2$H$_5$ | H |
| 19 | CH$_3$ | H | C$_2$H$_5$ | C$_2$H$_5$ | CH$_3$ | H |
| 20 | CH(CH$_3$)$_2$ | H | C$_2$H$_5$ | C$_2$H$_5$ | CH(CH$_3$)$_2$ | H |
| 21 | C$_3$H$_7$ | C$_2$H$_5$ | H | C$_2$H$_5$ | C$_3$H$_7$ | C$_6$H$_5$ |
| 22 | C$_2$H$_5$ | H | C$_6$H$_5$CH$_2$ | C$_2$H$_5$ | C$_2$H$_5$ | H |
| 23 | C$_6$H$_5$CH$_2$ | C$_6$H$_5$ | H | C$_2$H$_5$ | C$_6$H$_5$CH$_2$ | C$_6$H$_5$ |

EXAMPLE 7

1-benzyl-4-(phenethylidenehydrazino)-1H-pyrazolo[3,4-b]pyridine-5-carboxylic acid, ethyl ester, hydrochloride By treatment of 1-benzyl-4-hydroxy-1H-pyrazolo[3,4-b]pyridine-5-carboxylic acid ethyl ester with ethyl iodide according to the procedure of Example 1(c), 1-benzyl-4-ethoxy-1H-pyrazolo[3,4-b]pyridine-5-carboxylic acid ethyl ester, M.P. 94–96°, is obtained. Then by hydrolyzing as in Example 1(b), the free acid is obtained, M.P. 181–182°.

By treating the ethyl ester with hydrazine hydrate according to the procedure of Example 1(d), 1-benzyl-4-hydrazino-1H-pyrazolo[3,4-b]pyridine-5-carboxylic acid ethyl ester, M.P. 159–161°, is obtained. The hydrochloride melts at 215°. Then by treating this hydrazine with acetophenone according to the procedure of Example 2, 1-benzyl-4-(phenethylidenehydrazino)-1H-pyrazolo[3,4-b]pyridine-5-carboxylic acid, ethyl ester, hydrochloride is obtained.

EXAMPLE 8

1-benzyl-4-[(5-nitrofurfurylidene)hydrazino]-1H-pyrazolo[3,4-b]pyridine-5-carboxylic acid, ethyl ester By treating 1-benzyl-4-ethoxy-1H-pyrazolo[3,4-b]pyridine-5-carboxylic acid ethyl ester with hydrazine hydrate as in Example 1 and then treating the product with 5-nitrofurfuraldehyde according to the procedure of Example 2, the above named compound, M.P. 205–207°, is obtained.

Treatment of each of the foregoing compounds of Formula VII with hydrazine hydrate as in Example 1(d) yields the corresponding hydrazine. Treatment of each of the hydrazines thus obtained with acetone as in Example 2 yields the 4-isopropylidenehydrazino-1H-pyrazolo[3,4-b]pyridine carboxylic acid, hydrochloride, or ester thereof, having the same substituents R, $R_2$ and $R_3$ listed in the second column above. Similarly, by substituting for the acetone an equivalent amount of benzaldehyde, p-chlorobenzaldehyde, cyclopentanone or acetophenone, respectively, the 4-benzylidene hydrazine, 4-(4-chlorobenzylidene)hydrazince, 4-cyclopentylidene hydrazine and 4-(1-phenethylidene)hydrazine and hydrochloride salt, respectively, are obtained.

The following additional compounds are produced by the procedure of Example 1.

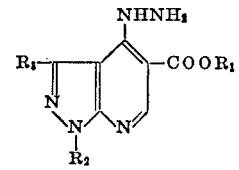

| | $R_1$ | $R_2$ | $R_3$ | M.P., degrees |
|---|---|---|---|---|
| Example: | | | | |
| 24 | (CH$_3$)$_2$CH$_2$ | C$_2$H$_5$ | H | 86–88 |
| 25 | C$_2$H$_5$ | CH$_3$ | H | [1] 208–209 |
| 26 | C$_2$H$_5$ | CH(CH$_3$)$_2$ | H | 136–138 |

[1] HCl.

The following additional compounds are produced by the procedure of Example 2.

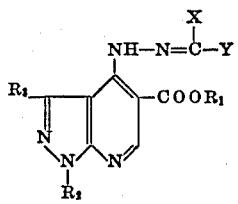

| | R₁ | R₂ | R₃ | X | Y | M.P., degrees |
|---|---|---|---|---|---|---|
| Example: | | | | | | |
| 27 | C₂H₅ | C₂H₅ | H | (CH₂)₃CH₃ | (CH₂)₃CH₃ | ¹ 156 |
| 28 | (CH₂)₃CH₃ | C₂H₅ | H | CH₃ | CH₃ | ¹ 149 |
| 29 | C₂H₅ | CH₃ | H | CH₃ | CH₃ | ¹ 212–213 |
| 30 | C₂H₅ | CH(CH₃)₂ | H | CH₃ | CH₃ | ¹ 215–216 |

¹ HCl.

EXAMPLE 31

1-ethyl-4-(2-phenylhydrazino)-1H-pyrazolo[3,4-b] pyridine-5-carboxylic acid, ethyl ester By substituting an equivalent amount of phenylhydrazine for the hydrazine hydrate in the procedure of Example 1(d), 1-ethyl-4-(2-phenylhydrazino)-1H-pyrazolo [3,4-b]pyridine-5-carboxylic acid, ethyl ester, M.P. 176–177°, is obtained.

EXAMPLE 32

1-ethyl-4-[[2-hydroxy - 1 - (hydroxymethyl)ethylidene] hydrazino]-1H-pyrazolo[3,4-b]pyridine - 5 - carboxylic acid, ethyl ester By substituting an equivalent amount of dihydroxyacetone for the acetone in the procedure of Example 2, 1-ethyl-4-[[2-hydroxy - 1 - (hydroxymethyl)ethylidene]hydrazino]-1H-pyrazolo[3,4-b]pyridine-5 - carboxylic acid, ethyl ester, M.P. 175–177°, is obtained.

EXAMPLE 33

1-ethyl-4-(2-tert.butylhydrazino)-1H-pyrazolo[3,4-b] pyridine-5-carboxylic acid, ethyl ester, hydrochloride By substituting an equivalent amount of tertiarybutylhydrazine for the hydrazine in Example 1(d) 1-ethyl-4-(2-tert.butylhydrazino)-1H-pyrazolo[3,4-b]pyridine-5 - carboxylic acid, ethyl ester, hydrochloride is obtained.

EXAMPLE 34

1-benzyl-4-(2,2-diethylhydrazino)-1H-pyrazolo[3,4-b] pyridine-5-carboxylic acid, ethyl ester, hydrochloride To 31.6 grams of 1-benzyl-4-ethoxy-1H-pyrazolo[3,4-b] pyridine-5-carboxylic acid, ethyl ester, in 500 ml. of absolute ethanol there are added 9 gdams of 1,1-diethylhydrazine and 0.2 gram of zinc chloride. The mixture is refluxed for 5 hours, filtered and concentrated to dryness under reduced pressure. The 1-benzyl-4-(2,2-diethylhydrazino)-1H-pyrazolo[3,4-b]pyridine-5 - carboxylic acid, ethyl ester, thus obtained is crystallized from aqueous alcohol.

The compound thus obtained is converted to the hydrochloride by treatment of an alcoholic solution with an equivalent amount of alcoholic hydrogen chloride and precipitating the hydrochloride thus formed with anhydrous ether.

EXAMPLE 35

4-(2-acetylhydrazino)-1-ethyl-1H-pyrazolo[3,4-b]pyridine-5-carboxylic acid, ethyl ester To 25 ml. of acetic anhydride there is added 3 grams of 4-(2-hydrazino) - 1 - ethyl-1H-pyrazolo[3,4-b]pyridine-5-carboxylic acid, ethyl ester. The mixture is heated at 100° for one hour and is then cooled and filtered. The solid is recrystallized from 95% ethanol, M.P. 221–222°.

EXAMPLE 36

4-(2,2-diacetylhydrazino)-1-ethyl-1H-pyrazolo[3,4-b] pyridine-5-carboxylic acid, ethyl ester To 25 ml. of acetic anhydride there are added 3 grams of 4-(2-hydrazino) - 1 - ethyl-1H-pyrazolo[3,4-b]pyridine-5-carboxylic acid, ethyl ester. The mixture is heated at 100° for about one hour and is then cooled and filtered to remove the monoacetylated derivative. The filtrate is stirred with 100 ml. of ice water to hydrolyze the unreacted acetic anhydride. The solid which precipitates is filtered and washed with water. The 4-(2,2-diacetylhydrazino)-1-ethyl-1H-pyrazolo[3,4-b]pyridine - 5 - carboxylic acid, ethyl ester is crystallized from hexane, M.P. 113–114°.

EXAMPLE 37

1-ethyl-4-hydrazino-1H-pyrazolo[3,4-b]pyridine-5-carboxylic acid ethyl ester (a) 4-chloro - 1 - ethyl-1H-pyrazolo[3,4-b]pyridine-5-carboxylic acid ethyl ester: A mixture of 23.5 g. of 1-ethyl-4-hydroxy-1H-pyrazolo[3,4-b]pyridine - 5 - carboxylic acid ethyl ester (0.1 mol.) and 150 ml. of phosphorus oxychloride is refluxed for four hours. Subsequently the excess phosphorus oxychloride is removed by distillation in vacuo. As soon as the phosphorus oxychloride has been removed, the oily residue solidifies on cooling. It is treated with water and filtered under suction to obtain 4-chloro-1-ethyl-1H-pyrazolo[3,4-b]pyridine - 5 - carboxylic acid ethyl ester (24.5 g.), M.P. 55–60° C. This product is recrystallized from n-hexane (22.5 g.=87%), M.P. 62°.

(b) 1 - ethyl-4-hydrazino-1H-pyrazolo[3,4-b]pyridine-5-carboxylic acid ethyl ester: To a solution of 5.08 g. of 4-chloro - 1 - ethyl-1H-pyrazolo[3,4-b]pyridine-5-carboxylic acid ethyl ester (0.02 mol.) in 50 ml. of benzene are added 2.5 g. of hydrazine hydrate (100%) (0.05 mol.). This mixture is stirred at room temperature for 4 days. After this time, the separated hydrazine hydrochloride is filtered under suction and the filtrate is evaporated in vacuo to dryness. The residual product, 1-ethyl-4-hydrazino-1H-pyrazolo[3,4-b]pyridine - 5 - carboxylic acid ethyl ester, is recrystallized from benzene, M.P. 139–140°.

EXAMPLE 38

1-ethyl-4-phenylhydrazino-1H-pyrazolo[3,4-b]pyridine-5-carboxylic acid ethyl ester A solution of 25.3 g. of 4-chloro-1-ethyl-1H-pyrazolo-[3,4-b]pyridine-5-carboxylic acid ethyl ester (0.1 mol.) and 21.6 g. of phenylhydrazine (0.2 mol.) in 200 ml. of benzene is refluxed for four hours. After cooling, the separated phenylhydrazine hydrochloride is filtered under suction and the filtrate is evaporated in vacuo to dryness. The product, 1-ethyl - 4 - phenylhydrazino-1H-pyrazolo-[3,4-b]pyridine-5-carboxylic acid ethyl ester is recrystallized from 96% ethanol, M.P. 176–177°.

By reacting the hydrazines obtained in Examples 10 to 26, respectively, with the anhydride $(R_4CO)_2O$ instead of with acetic anhydride either as in Example 35 or in Example 36, respectively, the following lower alkanoyl or di-lower alkanoyl hydrazides are obtained:

(b) 4 - chloro - 1 - ethyl - methyl - 1H - pyrazolo[3,4-b]pyridine-5-carboxylic acid ethyl ester: A mixture of 49.1 g. of 1-ethyl-6-methyl-4-hydroxy-1H-pyrazolo[3,4-b]pyridine-5-carboxylic acid ethyl ester (0.197 mol.) and 250 ml. of phosphorous oxychloride is refluxed for 4 hours. The excess phosphorous oxychloride is removed by vacuum distillation and the residue is treated with water. The 4-chloro compound (42 g.) is filtered under suction and recrystallized from n-hexane, M.P. 54–56°.

(c) 1 - ethyl - 4 - hydrazino - 6 - methyl - 1H - pyrazolo-[3,4-b]pyridine-5-carboxylic acid ethyl ester: To a solution of 10.7 g. of 4-chloro-1-ethyl-6-methyl-1H-pyrazolo-[3,4-b]pyridine-5-carboxylic acid ethyl ester (0.04 mol.) in 160 ml. of benzene and 80 ml. of pyridine are added 4 g. of hydrazine hydrate (100%) (0.08 mol.). The mixture is stirred at room temperature for 7 days. After this period the precipitated hydrazine hydrochloride (2.5 g.) is filtered under suction and the filtrate is evaporated in

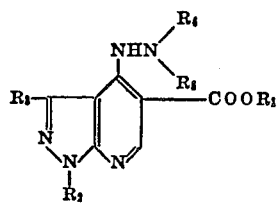

| Example: | $R_1$ | $R_2$ | $R_3$ | $R_4$ | $R_5$ |
|---|---|---|---|---|---|
| 39 | $C_2H_5$ | $o$-$ClC_6H_4CH_2$ | $CH_3$ | H | $C_3H_7CO$ |
| 40 | $C_2H_5$ | H⟩—$CH_3$ | $CH_3$ | $CH_3CO$ | H |
| 41 | $C_2H_5$ | Same as above | H | $CH_3CO$ | $CH_3CO$ |
| 42 | H | $C_3H_7$ | H | $C_2H_5CO$ | $C_2H_5CO$ |
| 43 | $C_2H_5$ | $p$-$ClC_6H_4CH_2$ | H | $CH_3CO$ | H |
| 44 | H | $p$-$ClC_6H_4CH_2$ | H | $CH_3CO$ | H |
| 45 | $C_2H_5$ | $CH_3$ | $CH_3$ | $CH_3CO$ | $CH_3CO$ |
| 46 | $C_2H_5$ | $C_6H_5CH$ $CH_3$ | $(CH_3)_2CH$ | $CH_3CO$ | H |
| 47 | $C_2H_5$ | $C_2H_5$ | H | $C_2H_5CO$ | $C_2H_5CO$ |
| 48 | $C_2H_5$ | $CH_3$ | H | $C_4H_7CO$ | H |
| 49 | $C_2H_5$ | $CH(CH_3)_2$ | H | $CH_3CO$ | H |
| 50 | $C_2H_5$ | $C_3H_7$ | $C_6H_5$ | $CH_3CO$ | H |
| 51 | $C_2H_5$ | $C_2H_5$ | H | $CH_3CO$ | H |
| 52 | $C_2H_5$ | $C_6H_5CH_2$ | $C_6H_5$ | $CH_3CO$ | H |
| 53 | $(CH_3)_2CH$ | $C_2H_5$ | H | $CH_3CO$ | H |
| 54 | $C_2H_5$ | $CH_3$ | H | $CH_3CO$ | $CH_3CO$ |
| 55 | $C_2H_5$ | $CH(CH_3)_2$ | H | $C_2H_7CO$ | H |

EXAMPLE 56

1-ethyl-4-(2-acetylhydrazino)-6-methyl-1H-pyrazolo[3,4-b]pyridine-5-carboxylic acid ethyl ester (a) 1-ethyl-6-methyl-4-hydroxy - 1H - pyrazolo[3,4-b]pyridine-5-carboxylic acid ethyl ester: 51.1 g. of 1-ethyl-5-aminopyrazole (0.46 mol.) and 101 g. of acetomalonic acid ethyl ester (0.5 mol.) are added to 224 g. of polyphosphorous acid. The mixture is heated with stirring at 120° for three hours. After this period, the mixture is cooled, diluted with 1000 ml. of water and subsequently extracted twice with 300 ml. portions of chloroform. The chloroform layers are collected, dried over sodium sulfate and the solvent is distilled off. Recrystallization of the residue (67 g.) with petroleum ether yields 1-ethyl-6-methyl-4 - hydroxy-1H-pyrazolo[3,4-b]pyridine-5-carboxylic acid ethyl ester, M.P. 118–120°.

vacuo at 30° (bath temperature) to dryness. The residue, 1 - ethyl - 4 - hydrazine - 6 - methyl - 1H - pyrazolo[3,4-b]pyridine-5-carboxylic acid ethyl ester is recrystallized from ethyl acetate followed by cooling in the refrigerator. On account of ring closure tendency of this compound, the recrystallization temperature is kept below 40°, M.P. 126–128°, yield 8.1 g. (77%).

(d) 1 - ethyl - 4 - (2 - acetylhydrazino) - 6 - methyl-1H-pyrazolo[3,4-b]pyridine-5-carboxylic acid ethyl ester: By treating the product of part (c) with acetic anhydride as in Example 35, 1-ethyl-4-(2-acetylhydrazino)-6-methyl-1H-pyrazolo[3,4-b]pyridine-5-carboxylic acid ethyl ester is obtained.

By reacting the product of Example 56 with acetic anhydride according to the procedure of Example 35 or Example 36 or by following the procedure of Example 56 and substituting for the acetic anhydride the appropriate anhydride $(R_4CO)_2O$, the following additional products are obtained:

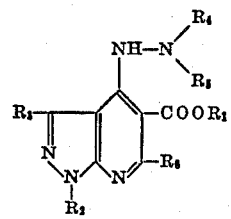

| | $R_1$ | $R_2$ | $R_3$ | $R_4$ | $R_5$ | $R_6$ |
|---|---|---|---|---|---|---|
| Example: | | | | | | |
| 57 | $C_2H_5$ | H | H | H | $C_3H_7CO$ | $CH_3$ |
| 58 | H | H | H | $C_3H_7CO$ | $C_3H_7CO$ | $CH_3$ |
| 59 | $C_2H_5$ | H | $C_2H_5$ | H | $C_5H_{11}CO$ | $CH_3$ |
| 60 | H | $C_6H_5CH_2$ | —C$_6$H$_5$ | H | $C_3H_7CO$ | $C_2H_5$ |
| 61 | $C_2H_5$ | Cl-C$_6$H$_4$-CH$_2$— | Cl-C$_6$H$_4$— | H | $C_2H_5CO$ | $CH_3$ |
| 62 | H | thienyl-CH$_2$— | H | $C_4H_7CO$ | $C_4H_7CO$ | $CH_3$ |
| 63 | $C_2H_5$ | thienyl-CH$_2$— | $C_2H_5$ | H | $C_2H_5CO$ | $CH_3$ |
| 64 | $C_2H_5$ | $C_6H_5CH_2CH_2$— | $C_2H_5$ | H | $C_2H_5CO$ | $CH_3$ |
| 65 | $C_2H_5$ | $C_6H_5CH_2CH_2$— | H | $C_2H_5CO$ | $C_2H_5CO$ | $CH_3$ |
| 66 | $C_6H_5CH_2$— | $C_2H_5$ | $CH_3$ | $C_2H_5CO$ | H | $CH_3$ |

EXAMPLE 67

By following first the procedure of Example 35 and then the procedure of Example 36, utilizing an equivalent amount of the following compounds instead of 4-(2-hydrazino)-1-ethyl-1H-pyrazolo[3,4-b]pyridine-5-carboxylic acid ethyl ester,
4-(2-hydrazino)-1-phenyl-1H-pyrazolo[3,4-b]pyridine-5-carboxylic acid ethyl ester
4-(2-hydrazino)-1,3-di(p-tolyl)-1H-pyrazolo[3,4-b]pyridine-5-carboxylic acid ethyl ester
1-(3,4-dimethoxyphenyl)-4-(2-hydrazino)-1H-pyrazolo[3,4-b]pyridine-5-carboxylic acid ethyl ester there are obtained, respectively, 4-(2-acetylhydrazino)-1,3-di(p-tolyl)-1H-pyrazolo[3,4-b]pyridine-5-carboxylic acid ethyl ester
4-(2,2-diacetylhydrazino)-1-phenyl-1H-pyrazolo[3,4-b]pyridine-5-carboxylic acid ethyl ester
4-(2-acetylhydrazino)-1,3-di(p-tolyl)-1H-ypyrazolo[3,4b]pyridine-5-carboxylic acid ethyl ester
4-(2,2-diacetylhydrazino)-1,3-di(p-tolyl)-1H-pyrazolo[3,4-b]pyridine-5-carboxylic acid ethyl ester
4-(2-acetylhydrazino)-1-(3,4-dimethoxyphenyl)-1H-pyrazolo[4-b]pyridine-5-carboxylic acid ethyl ester
4-(2,2-diacetylhydrazino)-1-(3,4-dimethoxyphenyl)-1H-pyrazolo[3,4-b]pyridine-5-carboxylic acid ethyl ester.

What is claimed is:
1. A compound of the formula

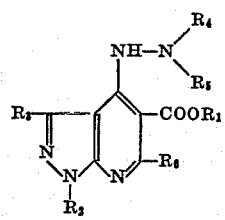

wherein $R_1$ is hydrogen, lower alkyl or phenyl-lower alkyl, $R_2$ is hydrogen, lower alkyl, phenyl, phenyl-lower alkyl, $R_7$, $R_8$-phenyl-lower alkyl of $C_3$-$C_6$ cycloalkyl-lower alkyl, $R_3$ is hydrogen, lower alkyl, phenyl or $R_7$, $R_8$-phenyl, $R_4$ is hydrogen or lower alkanoyl, $R_5$ is lower alkanoyl, $R_6$ is hydrogen methyl or ethyl and $R_7$ and $R_8$ each is halogen, lower alkyl or lower alkoxy and physiologically acceptable acid addition salts thereof.

2. A compound of the formula

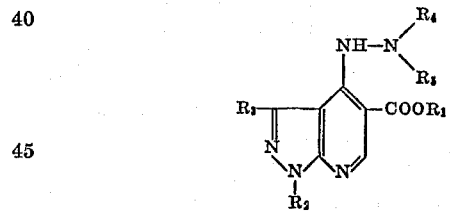

wherein $R_1$ is hydrogen, lower alkyl or phenyl-lower alkyl, $R_2$ is lower alkyl, phenyl, phenyl-lower alkyl, $R_7$, $R_8$-phenyl-lower alkyl or $C_3$-$C_6$ cycloalkyl-lower alkyl, $R_3$ is hydrogen, lower alkyl, phenyl or $R_7$, $R_8$-phenyl, $R_4$ is hydrogen or lower alkanoyl, $R_5$ is lower alkanoyl and $R_7$ and $R_8$ each is halogen, lower alkyl or lower alkoxy and physiologically acceptable acid addition salts thereof.

3. A compound as in claim 1 wherein $R_1$ and $R_2$ each is lower alkyl, $R_3$ and $R_4$ each is hydrogen and $R_5$ is lower alkanoyl.

4. A compound as in claim 3 wherein each lower alkyl group is ethyl and the lower alkanoyl group is acetyl.

5. A compound as in claim 1 wherein $R_1$ and $R_2$ each is lower alkyl, $R_3$ is hydrogen and $R_4$ and $R_5$ each is lower alkanoyl.

6. A compound as in claim 5 wherein each lower alkyl group is ethyl and each lower alkanoyl group is acetyl.

References Cited
UNITED STATES PATENTS 3,629,271  12/1971  Hoehn _____ 260—295.5 B
3,761,487  9/1973  Hoehn et al. _____ 260—295.5 B ALAN L. ROTMAN, Primary Examiner U.S. Cl. X.R.

260—240 G, 294.8 C; 424—266